US010358787B2

(12) United States Patent
Coordes et al.

(10) Patent No.: US 10,358,787 B2
(45) Date of Patent: Jul. 23, 2019

(54) WIND TURBINE

(71) Applicant: Wobben Properties GmbH, Aurich (DE)

(72) Inventors: Thomas Coordes, Ihlow (DE); Frank Pollmann, Hamburg (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 15/755,028

(22) PCT Filed: Aug. 29, 2016

(86) PCT No.: PCT/EP2016/070296
§ 371 (c)(1),
(2) Date: Feb. 23, 2018

(87) PCT Pub. No.: WO2017/032904
PCT Pub. Date: Mar. 2, 2017

(65) Prior Publication Data
US 2018/0258604 A1 Sep. 13, 2018

(30) Foreign Application Priority Data
Aug. 27, 2015 (DE) .......... 10 2015 216 444

(51) Int. Cl.
E02D 27/42 (2006.01)
F03D 13/20 (2016.01)
E04H 12/34 (2006.01)

(52) U.S. Cl.
CPC .......... E02D 27/425 (2013.01); F03D 13/22 (2016.05); E04H 12/341 (2013.01); F05B 2260/301 (2013.01); Y02E 10/728 (2013.01)

(58) Field of Classification Search
CPC ....... E02D 27/42; E02D 27/425; F03D 13/22; Y02E 10/728; E04H 12/341
See application file for complete search history.

(56) References Cited

U.S. PATENT DOCUMENTS 8,402,718 B2    3/2013  Stiesdal
8,720,139 B2 *  5/2014  Henderson .............. E04C 5/125
                                                        52/295

(Continued)

FOREIGN PATENT DOCUMENTS

CA    2853246 A1    5/2013
CN    202215017 U   5/2012

(Continued)

Primary Examiner — Gisele D Ford
(74) Attorney, Agent, or Firm — Seed Intellectual Property Law Group LLP

(57) ABSTRACT

A wind turbine having a foundation. The foundation has a first foundation portion having a top side and a concrete foundation pedestal having a top side. The top side of the concrete foundation pedestal is annular and projects beyond the top side of the first foundation portion. The wind turbine also has a steel tower having a plurality of tower segments, wherein a lower tower segment has a flange having a plurality of through bores. The flange is placed on a top side of the concrete foundation. The wind turbine further has a plurality of clamping elements. A lower end of the clamping elements is fixed by means of a fixing unit in or under the first foundation portion. An upper end of the clamping elements projects beyond an upper end of the concrete foundation pedestal and extends through the through holes. The upper ends of the clamping elements are braced by means of fixing units. An outward side of the concrete foundation pedestal is of a conical configuration.

8 Claims, 3 Drawing Sheets

(56) References Cited

U.S. PATENT DOCUMENTS

| | | | |
|---|---|---|---|
| 8,782,979 B2 | 7/2014 | Tuominen | |
| 9,322,396 B2 | 4/2016 | Coordes | |
| 2008/0155907 A1* | 7/2008 | Wobben | E02D 27/42 52/169.13 |
| 2008/0302038 A1* | 12/2008 | Wobben | E02D 27/42 52/296 |
| 2009/0282774 A1* | 11/2009 | Jensen | E02D 27/42 52/698 |
| 2011/0138706 A1* | 6/2011 | Voss | E02D 27/42 52/173.1 |
| 2011/0138731 A1* | 6/2011 | Yoshimura | E04H 12/08 52/651.01 |
| 2012/0070233 A1* | 3/2012 | Wang | E02D 27/42 405/232 |
| 2012/0260592 A1* | 10/2012 | Wolf | F03D 13/22 52/296 |
| 2013/0125480 A1* | 5/2013 | Maestre | E02D 27/42 52/126.1 |
| 2013/0129525 A1* | 5/2013 | Pabst | E04H 12/12 416/244 R |
| 2013/0199117 A1* | 8/2013 | Tuominen | E02D 27/42 52/297 |
| 2014/0069046 A1* | 3/2014 | Cai | E04H 12/08 52/651.01 |
| 2014/0318033 A1* | 10/2014 | Coordes | E02D 27/42 52/40 |
| 2015/0143765 A1 | 5/2015 | Carril González et al. | |
| 2016/0169209 A1 | 6/2016 | Coordes et al. | |
| 2018/0030959 A1* | 2/2018 | Hoeeg | E04H 12/085 |

FOREIGN PATENT DOCUMENTS

| | | |
|---|---|---|
| CN | 103243735 A | 8/2013 |
| CN | 203924104 U | 11/2014 |
| DE | 202009013844 U1 | 3/2010 |
| DE | 102007060379 B4 | 2/2014 |
| DE | 102013211750 A1 | 12/2014 |
| EP | 1526278 A1 | 4/2005 |
| EP | 2375057 A1 | 10/2011 |
| EP | 2821565 A1 | 1/2015 |
| WO | 2012035206 A1 | 3/2012 |

* cited by examiner

WIND TURBINE

BACKGROUND

Technical Field

The present invention concerns a wind turbine.

Description of the Related Art

Before a tower of a wind turbine is erected it is necessary to provide a suitable concrete foundation in the ground. The foundation is typically cast with concrete on site (in-situ concrete). After the concrete has set a first segment of the tower of the wind turbine can be placed on the foundation. WO 2012/035206 A1 shows a wind turbine and a foundation of a wind turbine.

On the German patent application from which priority is claimed the German Patent and Trade Mark Office searched the following documents: DE 10 2007 060 379 B4, DE 10 2013 211 750 A1, DE 20 2009 013 844 U1, EP 2 375 057 A1, EP 2 821 565 A1, WO 2012/035 206 A1, CN 203 924 104 U1 and CN 203924104 U.

BRIEF SUMMARY

Provided are a wind turbine and a tower of a wind turbine having an improved foundation.

Thus there is provided a wind turbine having a foundation. The foundation has a first foundation portion having a top side and a concrete foundation pedestal having a top side. The top side of the concrete foundation pedestal is annular and projects beyond the top side of the first foundation portion. The wind turbine also has a steel tower having a plurality of tower segments, wherein a lower tower segment has a flange having a plurality of through bores. The flange is placed on a top side of the concrete foundation. The wind turbine further has a plurality of clamping elements. A lower end of the clamping elements is fixed by means of a fixing unit in or under the first foundation portion. An upper end of the clamping elements projects beyond an upper end of the concrete foundation pedestal and extends through the through holes. The upper ends of the clamping elements are braced by means of fixing units. An outward side of the concrete foundation pedestal is of a conical configuration. Provided in the concrete pedestal and in the foundation portion is a plurality of bores for receiving the clamping elements. The bores in the region of the concrete pedestal are through bores, through the entire height of the concrete pedestal.

According to an aspect of the present invention the clamping elements are in the form of threaded rods or in the form of stressing wire strands.

According to a further aspect of the present invention the height of the concrete foundation pedestal is greater than 2 m.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
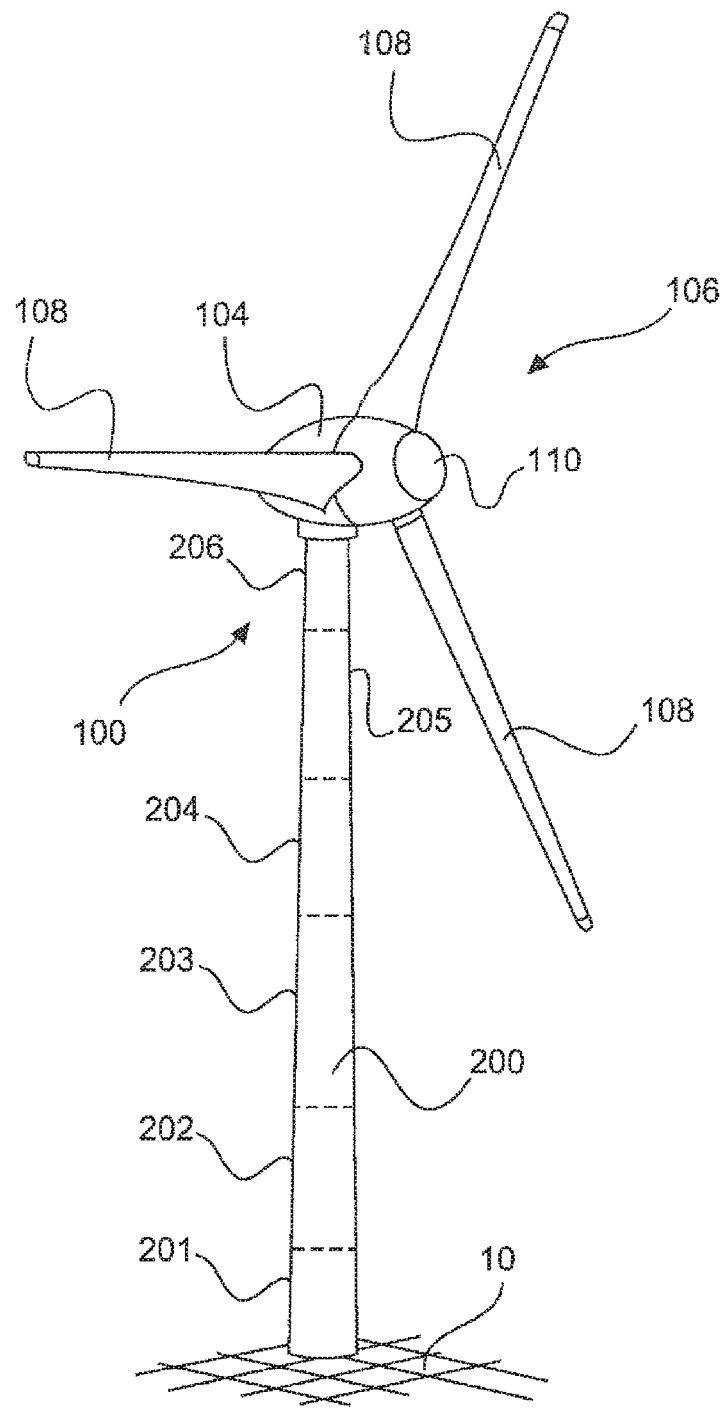
FIG. 1 shows a diagrammatic view of a wind turbine according to the invention.

FIG. 1 shows a diagrammatic view of a wind turbine according to the invention. The wind turbine 100 has a tower 200 and a pod 104.

The tower 200 comprises a plurality of tower segments 201-206. The tower segments 201-206 are produced in particular from steel. Provided on the pod 104 is a rotor 106 having (three) rotor blades 108 and a spinner 110. In operation of the wind turbine the rotor 106 is caused to rotate by the wind and thus also rotates a rotor or rotor member of an electric generator in the pod 104. The pitch angles of the rotor blades 108 can be varied by pitch motors at the rotor blade roots of the respective rotor blades 108.

Figure 2:
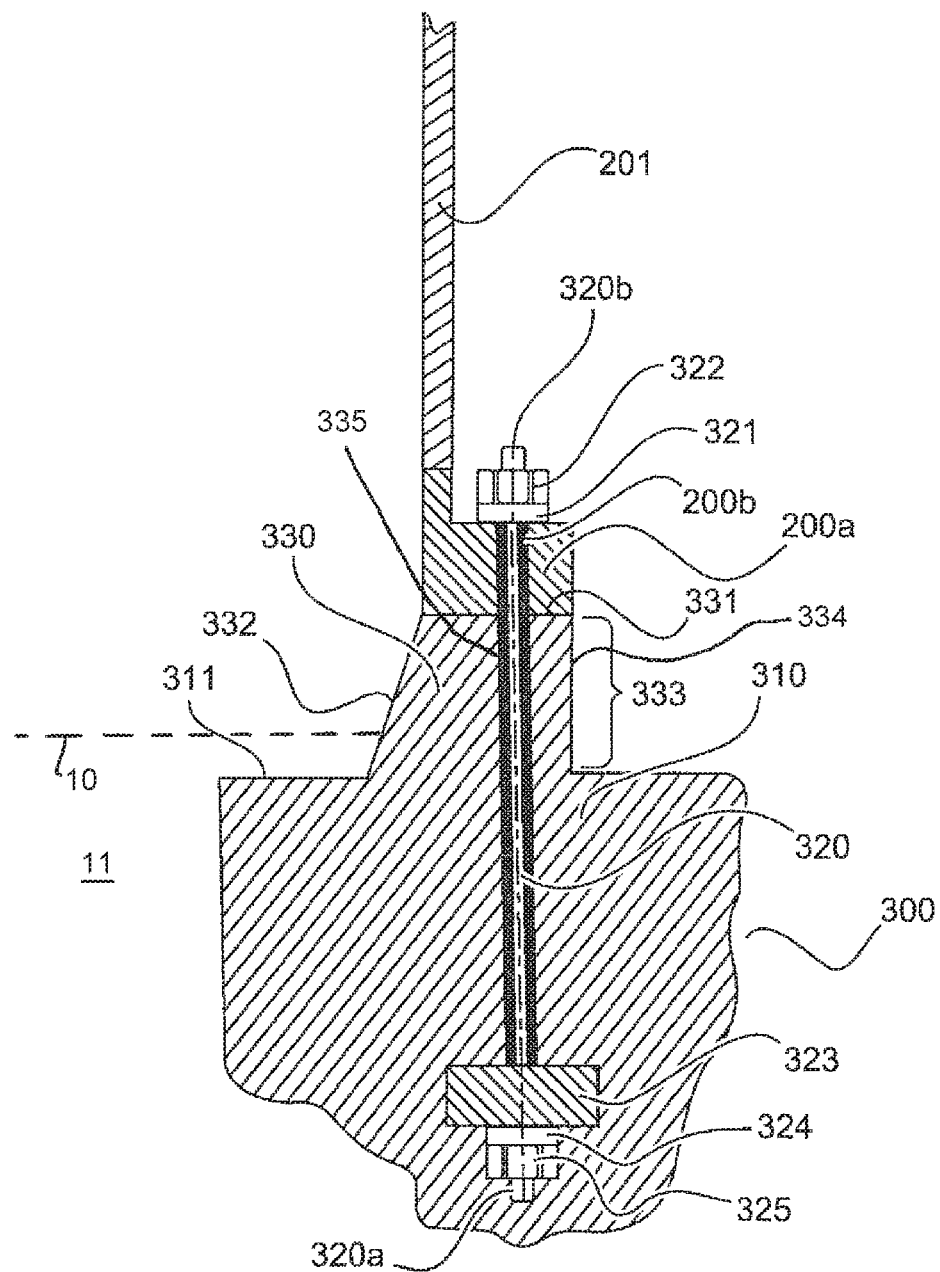
FIG. 2 shows a diagrammatic sectional view of a wind turbine foundation according to a first embodiment.

FIG. 2 shows a diagrammatic sectional view of a wind turbine foundation according to a first embodiment. A lower tower segment 201 of steel is placed on a foundation 300. The lower tower segment 201 has a flange 200a having a plurality of through bores 200b.

The foundation 300 can represent for example a foundation made of in-situ concrete. As an alternative thereto it is also possible to use a prefabricated concrete foundation. The foundation 300 has a foundation portion 310 and a concrete foundation pedestal 330. The foundation portion 310 has an upper edge or an upper end 311. The concrete foundation pedestal 330 projects beyond the upper edge 311. The flange 200a of the lower tower segment 201 is placed at a top side 331 of the concrete foundation pedestal 330. The concrete foundation pedestal 330 can be annular. The concrete foundation pedestal 330 can be concreted on to the upper edge 311 of the foundation portion 310. That concrete foundation pedestal 330 can also replace a lower tower portion.

The concrete pedestal 310 is of a conical configuration at its outward side 332 and is of a height 333 above the upper edge 311. An inward side 334 of the concrete pedestal 330 can be straight. The concrete foundation pedestal 300 has a plurality of through holes or bores 335 for receiving clamping elements 320. The pedestal 330 projects beyond a ground level 10 of the ground 11 in the region of the foundation (that is to say around the foundation).

The through bores 335 extend along the entire height of the concrete foundation pedestal 330.

A plurality of threaded rods 320 can be provided in the concrete foundation 300, wherein a lower end 320a of the threaded rod 320 is fixed by means of a plate 323, a washer 334 and a (hexagonal) nut 325. The other or upper end 320b of the threaded rod 320 projects beyond the upper end 331 of the concrete pedestal 330. The flange 200a has a plurality of through bores 200b. The through holes 200b are placed over the upper ends 320b of the threaded rods 320 and the flange 200a can be fixed for example by means of a plurality of washers 321 and nuts 322.

The concrete pedestal 330 and the flange 200a can be of an annular configuration.

Figure 3:
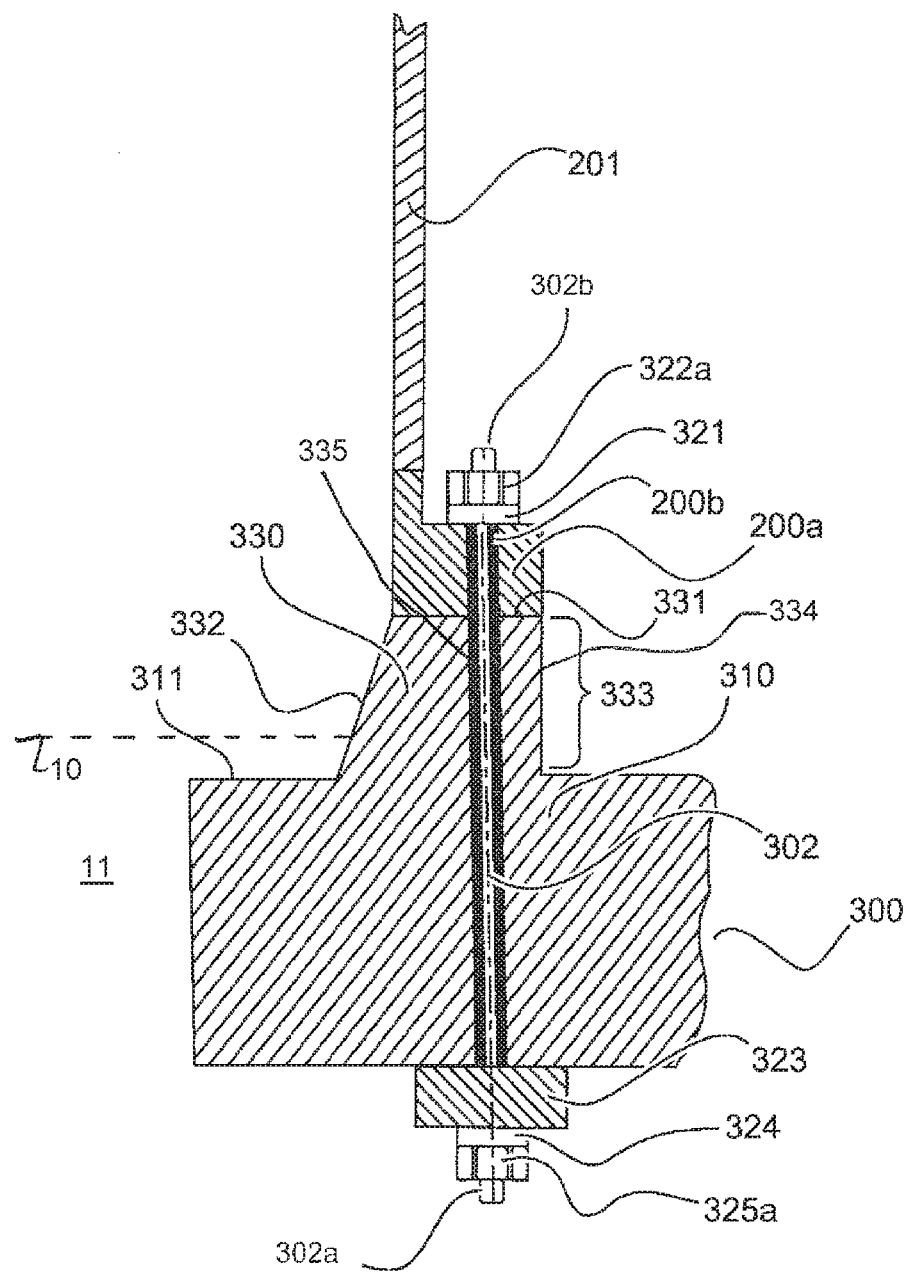
FIG. 3 shows a diagrammatic sectional view of a wind turbine foundation according to a second embodiment.

FIG. 3 shows a sectional view of a wind turbine foundation according to a second embodiment. A concrete foundation 300 has a first concrete foundation portion 310 having an upper end 311. The foundation 300 further has a concrete pedestal 330 which extends above the upper end 311 and has an upper end 331. The upper end 331 of the pedestal 330 can be in particular of a circular or annular configuration. A plate 323 or a ring 323 can be provided beneath the first foundation portion 310. Provided in the foundation is a plurality of clamping units like stressing wire strands 302, the lower ends 302*a* of which are held by means of a fixed anchor 325*a*. A tensioning anchor 322*a* can be provided at the upper end 302*b* of the stressing wire strand 302. The lower flange 200*a* of the lower tower segment 201 can be fixed to the foundation by means of the stressing wire strand 320*a*, the fixed anchor 325*a* and the tensioning anchor 322*a*.

The concrete pedestal 310 is of a conical configuration at its outward side 332 and is of a height 333 above the upper edge 311. An inward side 334 of the concrete pedestal 330 can be straight. The concrete foundation pedestal 300 has a plurality of through holes 335 for receiving clamping elements 320. The through bores 335 extend along the overall height of the concrete foundation pedestal 330. The pedestal 330 projects beyond a ground level 10 of the ground 11 in the region of the foundation (that is to say around the foundation).

The concrete foundation portion 310 can be in the form of in-situ concrete or in the form of a precast (concrete) foundation. The concrete foundation pedestal 310 is of a conical configuration, that is to say the outside diameter of the lower end 334 is larger than the outside diameter of the upper end 331. The transmission of load of the tower 200 to the foundation 300 can be improved or optimized by virtue of the larger outside diameter at the lower end while the outside diameter of the lower tower portion can be reduced, which is advantageous in regard to transport.

The height 333 of the foundation pedestal 310 can correspond to a height of a lower tower segment (that is to say for example >3 m) so that the lower tower segment 201 can be at least partially replaced by a higher foundation pedestal 310.

The conical configuration of the concrete foundation pedestal 330 means that it is possible to increase a diameter, that is structurally and/or statically necessary, in respect of the transition between the pedestal and the foundation portion. Nonetheless the diameter of the upper end of the pedestal (and thus the diameter of the lower tower segment) can be reduced, more specifically to a degree less than the maximum width for on-land transport operations.

According to an aspect of the invention an underside of the flange 200*a* of the lower tower segment is placed directly on a top side 331 of the concrete foundation pedestal 330, which projects beyond an upper side of a first foundation portion 310.

A single-row screw structures or stressing structures for the lower tower segment 201 is provided. The through holes 200*b* in the flange 200*a* are provided within the wall of the lower tower segment so that the screw structures or stressing structures are provided within the wall of the lower tower segment and the stressing structure is thus protected from the influences of the weather. As an alternative thereto a dual-row screw structures is also possible. In that case the lower flange could be in the form of a T-flange.

Optionally the top side 311 of the foundation portion can correspond to a ground level so that the pedestal 330 projects above the ground level.

The invention claimed is:

1. A wind turbine comprising:
   a foundation, wherein the foundation has a first foundation portion having a top side and a concrete foundation pedestal having a top side, wherein the top side of the concrete foundation pedestal is annular and projects beyond the top side of the first foundation portion, wherein the first foundation portion and the concrete foundation pedestal are made of in situ concrete, wherein a height of the concrete foundation pedestal is greater than 2 meters, wherein a plurality of through bores are provided in the concrete foundation pedestal and in the first foundation portion,
   a steel tower having a plurality of tower segments, wherein the plurality of tower segments includes a lower tower segment having a flange having a plurality of through bores, wherein the flange is placed on the top side of the concrete foundation pedestal, and
   a plurality of clamping elements, wherein lower ends of the clamping elements are fixed by first fixing units in or under the first foundation portion, wherein upper ends of the clamping elements project beyond an upper end of the concrete foundation pedestal and extend through the plurality of through bores of the concrete foundation pedestal, the first foundation portion, and the flange, respectively, wherein the upper ends of the clamping elements are braced by second fixing units,
   wherein at least an outward side of the concrete foundation pedestal is conical.

2. The wind turbine according to claim 1 wherein the clamping elements are threaded rods or stressed wire strands.

3. The wind turbine according to claim 1 wherein the top side of the concrete foundation pedestal projects above a ground level.

4. The wind turbine according to claim 3 wherein a portion of the concrete foundation pedestal is below the ground level.

5. The wind turbine according to claim 3 wherein the first foundation portion is below the ground level.

6. The wind turbine according to claim 3 wherein a first portion of the concrete foundation pedestal is below the ground level and a second portion of the concrete foundation pedestal extends above the ground level by a distance.

7. A method of erecting a wind turbine comprising:
   forming a foundation in a ground, wherein the foundation has a foundation portion having a top side and a concrete foundation pedestal having a top side, wherein the top side of the concrete foundation pedestal is annular and projects beyond the top side of the first foundation portion, and wherein the concrete foundation pedestal has a portion that projects from a surface of the ground, wherein forming the foundation in the ground comprises forming the first foundation portion and the concrete foundation pedestal of in situ concrete,
   placing a steel tower having a plurality of tower segments on the foundation, wherein a lower tower segment of the plurality of tower segments has a flange having a plurality of through bores, wherein placing the steel tower comprises placing the flange on the top side of the concrete foundation pedestal,
   fixing lower ends of a plurality of clamping elements by first fixing units in or under the foundation portion, wherein upper ends of the plurality of clamping elements project beyond the upper end of the concrete foundation pedestal and extend through the through bores in the flange, and
   bracing the upper ends of the plurality of clamping elements by second fixing units,
   wherein at least an outward side of the concrete foundation pedestal is conical, and
   wherein the clamping elements extend through bores in the concrete foundation pedestal and in the foundation portion.

8. The method according to claim 7, wherein forming the foundation in the ground comprises forming a first portion of the concrete foundation pedestal below the surface of the ground and forming a second portion of the concrete foundation pedestal to extend above the surface of the ground.

* * * * *